US012753612B2

(12) United States Patent
Druzgalski

(10) Patent No.: US 12,753,612 B2
(45) Date of Patent: Oct. 6, 2026

(54) ROLL-UP INTERCHANGEABLE TILE SYSTEM

(71) Applicant: Clara Druzgalski, Monterey, CA (US)

(72) Inventor: Clara Druzgalski, Monterey, CA (US)

( * ) Notice: Subject to any disclaimer, the term of this patent is extended or adjusted under 35 U.S.C. 154(b) by 151 days.

(21) Appl. No.: 18/611,969

(22) Filed: Mar. 21, 2024

(65) Prior Publication Data

US 2024/0318435 A1 Sep. 26, 2024

Related U.S. Application Data

(60) Provisional application No. 63/492,006, filed on Mar. 24, 2023.

(51) Int. Cl.
*E04F 13/08* (2006.01)
*B32B 3/16* (2006.01)
*E04F 13/09* (2006.01)
*E04F 15/16* (2006.01)

(52) U.S. Cl.
CPC ............ *E04F 13/0862* (2013.01); *B32B 3/16* (2013.01); *E04F 13/09* (2013.01); *E04F 15/166* (2013.01); *B32B 2419/04* (2013.01); *B32B 2439/00* (2013.01)

(58) Field of Classification Search
CPC ..... E04F 13/0862; E04F 15/166; E04F 13/09; B32B 3/16; B32B 2439/00; B32B 2439/40; B32B 2439/60; B32B 2439/62; B32B 2439/66; B32B 2419/04
See application file for complete search history.

(56) References Cited

U.S. PATENT DOCUMENTS

| | | | | |
|---|---|---|---|---|
| 2,135,118 | A | 11/1938 | Stewart | |
| 2,693,102 | A | 11/1954 | Luster et al. | |
| 3,149,347 | A | 9/1964 | Morgan | |
| 3,589,507 | A * | 6/1971 | Greenberg | B44F 1/04 428/49 |
| 4,543,765 | A * | 10/1985 | Barrett | E04F 15/166 52/390 |
| 5,590,500 | A | 1/1997 | Mccue | |
| 5,778,463 | A | 7/1998 | Teckchandani et al. | |
| 5,916,102 | A | 6/1999 | Peyton | |
| 7,743,568 | B1 | 6/2010 | Mars | |
| 8,096,093 | B1 | 1/2012 | Poon | |
| 8,590,252 | B2 | 11/2013 | Cordeiro | |
| 9,833,111 | B2 | 12/2017 | Torres | |
| 9,956,704 | B2 | 5/2018 | Grunwald et al. | |
| D847,311 | S | 4/2019 | Allen | |

(Continued)

FOREIGN PATENT DOCUMENTS

| | | | |
|---|---|---|---|
| CA | 2677109 | C | 4/2015 |
| CN | 103938817 | A | 7/2014 |

(Continued)

*Primary Examiner* — Andrew J Triggs
(74) *Attorney, Agent, or Firm* — Youngmin Lee; Grant Ehrlich, Esq.; Stites & Harbison, PLLC

(57) ABSTRACT

A tile system includes: a container; and a flexible frame within the container, the flexible frame having a plurality of windows configured to removably hold a plurality of tiles, wherein the flexible frame has a first length and a second length, wherein the first length is a length of a longest axis of the flexible frame in a planar configuration, the second length is the first length within the container, and the second length is less than the first length.

14 Claims, 13 Drawing Sheets

(56) References Cited

U.S. PATENT DOCUMENTS

| | | | |
|---|---|---|---|
| 10,889,995 B2 | 1/2021 | Midorikawa-Haelters et al. | |
| 11,053,689 B2 | 7/2021 | Zimbric et al. | |
| 11,325,415 B2 | 5/2022 | Lacasse-Veilleux et al. | |
| 2005/0246989 A1 | 11/2005 | Pringle et al. | |
| 2005/0257436 A1 | 11/2005 | Vanderpol | |
| 2010/0186333 A1 | 7/2010 | Miller | |
| 2013/0019552 A1 | 1/2013 | Murdock et al. | |
| 2013/0232904 A1 | 9/2013 | Drake, III | |
| 2019/0078329 A1 | 3/2019 | Ulici | |
| 2019/0359389 A1* | 11/2019 | Papp | B32B 3/16 |
| 2021/0219789 A1 | 7/2021 | Cook | |
| 2022/0003002 A1* | 1/2022 | Thomsen | E04F 13/0862 |
| 2024/0318435 A1* | 9/2024 | Druzgalski | E04F 13/0862 |

FOREIGN PATENT DOCUMENTS

| | | |
|---|---|---|
| GB | 2499845 A | 9/2013 |
| WO | 2020202065 A1 | 10/2020 |

* cited by examiner

ROLL-UP INTERCHANGEABLE TILE SYSTEM

CROSS-REFERENCE TO RELATED APPLICATION

This application is a non-provisional application of and claims priority to U.S. provisional application No. 63/492,006, filed on Mar. 24, 2023, in the U.S. Patent and Trademark Office, and all the benefits accruing therefrom under 35 U.S.C. § 119, the entire contents of which are incorporated herein by reference.

BACKGROUND

(1) Field

Disclosed is a tile system including roll-up interchangeable tile system, a method of providing the tile system, a method of manufacturing a flexible frame, and a method of installing a tile pattern using the tile system.

(2) Description of the Related Art

Homeowners often either use tile with grout or prefabricated panels for baths, showers, and backsplashes. Currently, when homeowners want to install a kitchen backsplash, for example, their options include (a) tile and grout, (b) peel and stick tiles, or (c) detachable panel. Tile and grout option demands skilled labor to install the backsplash and cannot easily be changed. Peel and stick tiles are easy to install but because of the adhesive backing, they are not easy to detach and reattach for cleaning or reuse in the future. A detachable panel is designed into a depression in the wall to remain flush with the surrounding tile or wall. Each panel has to be made to fit the exact size of the wall depression.

Also, existing methods for creating a shower or a bath wall include (a) tile and grout, or (b) prefabricated wall panels. Tile and grout method demands skilled labor to install, the design cannot easily be changed, is difficult to clean due to the porous nature of grout, and needs to be periodically regrouted. Prefabricated wall panels made of a waterproof material, such as polyvinyl chloride (PVC), fiberglass, or acrylic, demand less skilled labor to install, but there are limited design and color options, and new patterns cannot easily be created. Once installed, the design or color cannot easily be changed. Large panels are difficult and expensive to ship. Homeowners that do not own large trucks cannot transport these large panels easily. Thus, there is a demand for an improved tile system.

SUMMARY

To address drawbacks of existing methods of installing backsplash or a shower, or a bath wall, disclosed is a tile system that is customizable and includes a flexible frame for easy transport. The flexible frame is made of a flexible material such that it can be rolled up or folded for easy shipping and transportation. The tile system can be used for the creation of side walls of a shower or bath; walls in the vicinity of a spa, pool, or sauna; or kitchen backsplash walls. The flexible frame can either be used permanently as the grout-like boundary between tiles. Alternatively, the flexible frame can be used temporarily as a template for spacing tiles, and then removed so that grout can be applied.

Disclosed herein is a tile system.

Disclosed herein is a method of providing the tile system.

Disclosed herein is a method of manufacturing a flexible frame.

Disclosed herein is a method of installing a tile pattern using the tile system.

Additional aspects will be set forth in part in the description which follows and, in part, will be apparent from the description, or may be learned by practice of the presented embodiments of the disclosure.

According to an aspect of the disclosure, a tile system includes: a container; and a flexible frame within the container, the flexible frame having a plurality of windows configured to removably hold a plurality of tiles, wherein the flexible frame has a first length and a second length, wherein the first length is a length of a longest axis of the flexible frame in a planar configuration, the second length is the first length within the container, and the second length is less than the first length.

According to an aspect of the disclosure, a tile system includes: a plurality of tiles, wherein the plurality of tiles has a tile parameter including a size and a shape; and a flexible frame, wherein the flexible frame has a plurality of windows configured to removably hold the plurality of tiles, the plurality of windows separated by a spacing parameter, and a frame parameter including a size and a shape according to the tile parameter and the spacing parameter, and wherein at least one of the plurality of tiles, the flexible frame having the plurality of windows, or a combination thereof, has an indication to match at least one tile of the plurality of tiles with at least one corresponding window of the plurality of windows.

According to an aspect of the disclosure, a method of providing a tile system includes: providing an image for a tile pattern; defining a tile parameter including a size and a shape of a plurality of tiles, wherein the plurality of tiles is combined to form the tile pattern; defining a spacing parameter of the spacing between the plurality of the tiles; providing a flexible frame having a plurality of windows configured to removably hold the plurality of tiles, wherein a frame parameter including a size and a shape of the flexible frame is defined according to the tile parameter of the plurality of tiles and the spacing parameter of the spacing between the plurality of tiles; and providing the plurality of tiles according to the tile parameter of the plurality of tiles, to provide a tile system.

According to an aspect of the disclosure, a method of manufacturing a flexible frame includes: providing a flexible material in a form of a sheet; cutting the flexible material to create the plurality of windows; and removing the cut portions of the flexible material from the flexible material, wherein the cutting includes die-cutting, laser-cutting, water-jet cutting, or a combination thereof, to manufacture the flexible frame.

According to an aspect of the disclosure, a method of installing a tile pattern using the tile system, includes: placing the flexible frame on a surface; and placing at least one tile of the plurality of tiles in at least one window the plurality of windows; and securing the plurality of tiles by compression force to create the tile pattern.

BRIEF DESCRIPTION OF THE DRAWINGS

The following figures are exemplary embodiments wherein the like elements are numbered alike, in which.

DETAILED DESCRIPTION

Figure 1A:
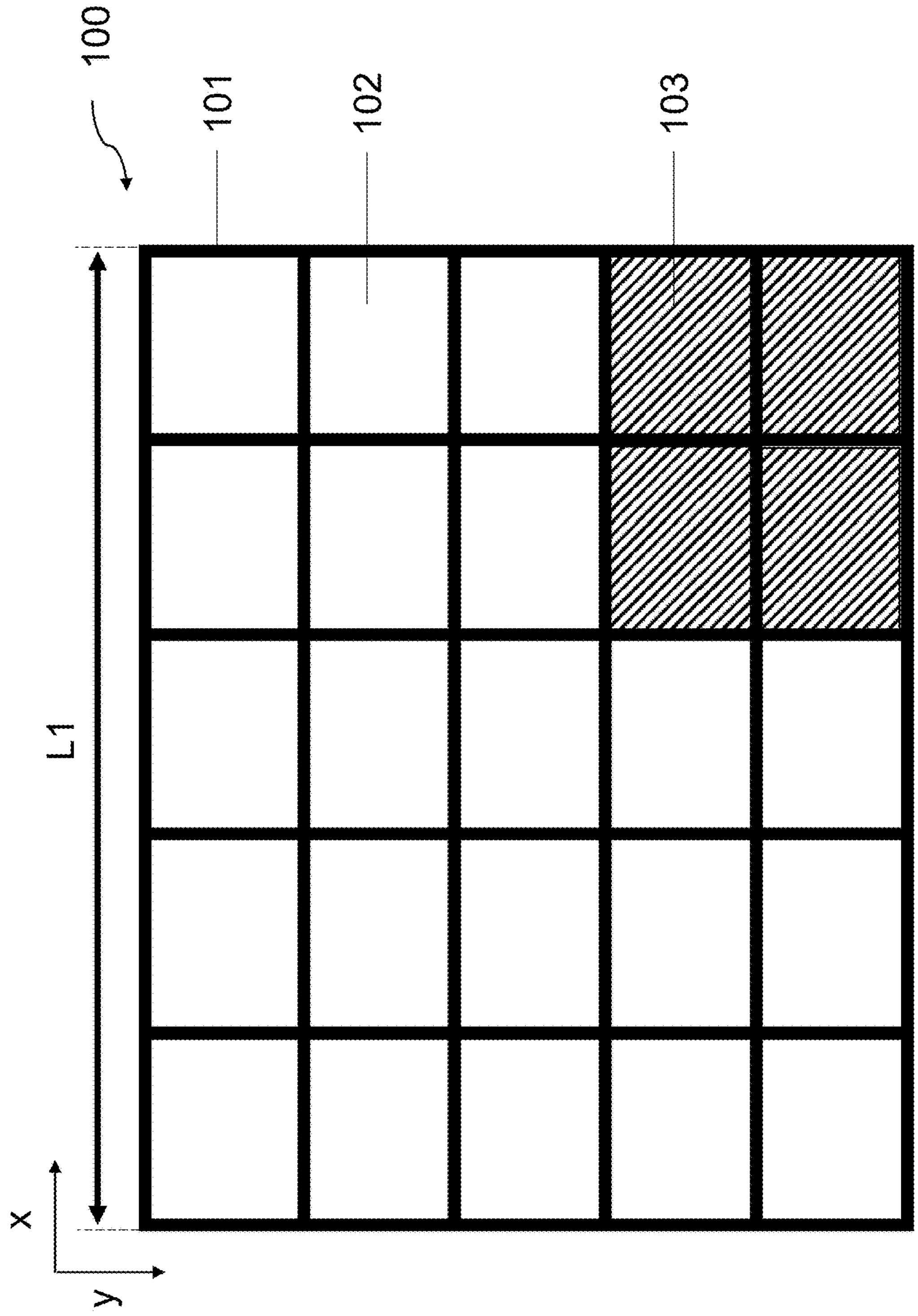
FIG. 1A is a schematic illustration of a flexible frame.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value. Endpoints of ranges may each be independently selected.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A detailed description of one or more embodiments of the disclosed tile system and methods of providing the same are presented herein by way of exemplification and not limitation with reference to the Figures.

Many homeowners like the aesthetic appeal of tiles because of the freedom to create different patterns. However, standard tile work has drawbacks. A drawback is that skilled labor is used to install tiles and grout correctly. For example, tiles are spaced evenly, grout is mixed and applied with skill, and expansion joints are used to prevent cracking from temperature changes. Also, grout is porous, which makes it subject to deterioration, water damage, mold or mildew growth, and staining. Also, creating a tile pattern more complex than a repeating set of squares or rectangles is difficult. The pattern must fill the space in an aesthetically pleasing manner. Determining an appropriate combination and/or pattern of polygons that fill the space while creating the design is difficult. Homeowners may like to have tile that has a mosaic-like or stained-glass-like quality. However, creating non-standard, unique patterns uses artistic skill and tile-laying skills, and is time-consuming and difficult to implement. Further, tiles installed with grout are permanent.

Thus, having the complex pattern already implemented in a structural mesh (e.g., frame, grid, web, screen, or weave) is in demand, in order to make it easier to fill in the holes with the appropriate tile-shaped pieces. Homeowners also may like to have the option of removable or interchangeable tiles so that they can change the theme, pattern, or color scheme without costly renovations.

An alternative to tile showers or baths is prefabricated shower walls, surrounds, or panels which do not have the foregoing and other problems. However, they are permanent installations. Additionally, the panels are large, which makes design and color options limited and not easily customizable. Also, the panels are large and rigid, which makes them difficult and expensive to transport without a truck.

Side walls of a shower, a tub, or shower unit, are often made of tiles surrounded by grout or wall panels made of waterproof materials that cover the drywall, backboard, wallboard, or subwalls to provide water resistant enclosures for showers and baths. Side walls of a tub, or a shower, created using tiles provide a high degree of customization, the design and pattern of the side walls can be highly customized by using tiles of different colors and textures. However, creating the tile wall uses skill in tile laying, grouting, sealing, and placement of expansion joints that not all may have. Maintaining tile walls involves frequent cleaning of grout, as well as periodic re-grouting. Replacing tile walls uses heavy duty labor and/or machinery to chisel between the tiles, which is costly, labor-intensive, and destroys the wall and tiles. Therefore, updating the look of a bathroom is expensive and time consuming.

Side walls of a tub, or a shower, created using panels use less on-site labor, but the design and pattern are not highly customizable. To reduce the number of joints, the panels are large, thus consumers' options are limited to only a few solid colors, textures, and materials. Replacing the side wall panels uses destructive methods to remove them from the backboard, wallboard, or subwalls. Therefore, updating the look of the bathroom is still expensive and time consuming.

Groutless tile systems have been proposed where a tile hooks or fastens onto the neighboring tiles by means of a geometric match, similar to interlocking puzzle pieces. However, this does not create a water-tight seal. Other examples include laminate adhesively attached, and thus not easily interchangeable. Prefabricated tiling systems have also been proposed which include a tiled panel assembly and an adhesive for mounting on a planar surface. Also, a tiled assembly on a support has been introduced. However, these examples still use grout or other adhesive mechanism and are not easily interchangeable once installed. Accordingly, there is a need for tile system that is more highly customizable, easier to install, and easier to update the look of the bathroom without destroying the wall.

Disclosed herein is an interchangeable tile system where the "grout" is a structural mesh made of flexible material such as rubber, silicon, plastic, cork, or a combination thereof. In the disclosed system the tiles can be pushed into and removed, facilitating rearranging the tile design as often as desired, or to remove the tiles. This makes for a tile system that can be installed without skilled labor, can be modified as often as desired, is easier to clean, e.g., the tile(s) can be removed for cleaning and then put back in place, is inexpensive to ship because the structural mesh can be rolled up, and can be cut to the size that fits the space so that custom sizes do not need to be manufactured for non-standard-sized tubs or showers. Alternatively, the structural mesh can be used as a temporary template for spacing tiles into complex patterns, and then removed so that grout can be applied.

Tile System

Disclosed is a tile system comprising: a container; and a flexible frame within the container, the flexible frame having a plurality of windows configured to removably hold a plurality of tiles, wherein the flexible frame has a first length and a second length, wherein the first length is a length of a longest axis of the flexible frame in a planar configuration, the second length is the first length within the container, and the second length is less than the first length.

FIG. 1A shows the flexible frame 100 in a planar configuration. The flexible frame 100 comprises a frame component 101 and a window component 102. The flexible frame 100 has the plurality of windows 102, which can hold the plurality of tiles 103.

The first length L1 is the longest axis (e.g., x-axis in FIG. 1A) of the flexible frame 100. The longest axis of the flexible frame 100 may be an x-axis or a y-axis of the flexible frame 100. The length of the x-axis and the y-axis of the flexible frame 100 may be the same, or may be different. A length of the shorter axis (e.g., y-axis in FIG. 1A) of the flexible frame 100 in a rolled or folded configuration, e.g., in a container, may also be less than a length of the shorter axis in the planar configuration. The first length L1 of the flexible frame 100 is not limited, for example, the first length L1 may be 1 inch (in) to 1000 in, 10 in to 500 in, 50 in to 100 in.

A thickness of the flexible frame 100 (e.g., z-axis, not shown) is not limited, for example, the thickness of the flexible frame may be 0.01 in to 10 in, 0.1 in to 1 in, 0.3 in to 0.7 in.

Figure 1C:
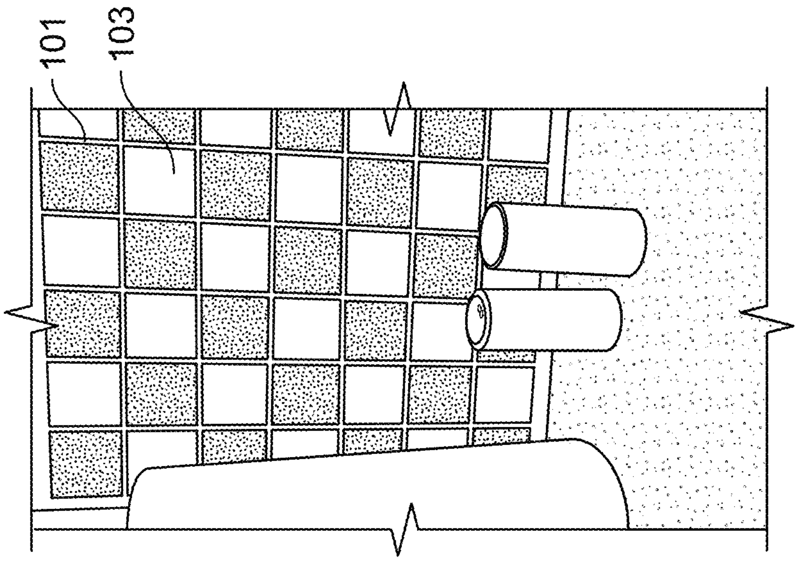
FIG. 1C is a schematic illustration photograph of an embodiment of a flexible frame having a plurality of tiles secured in the flexible frame.
Figure 1B:
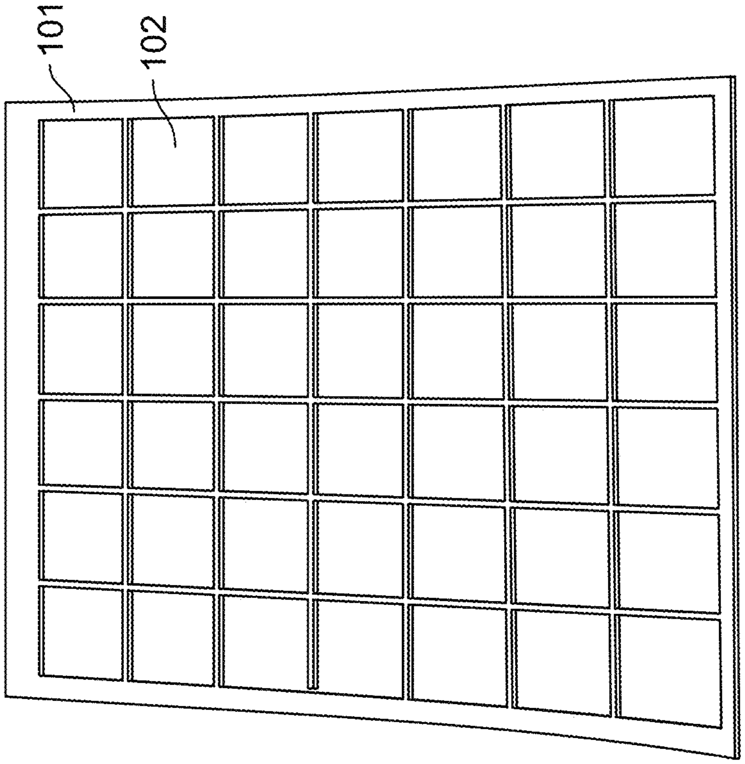
FIG. 1B is a schematic illustration of an embodiment of a flexible frame.
Figure 1D:
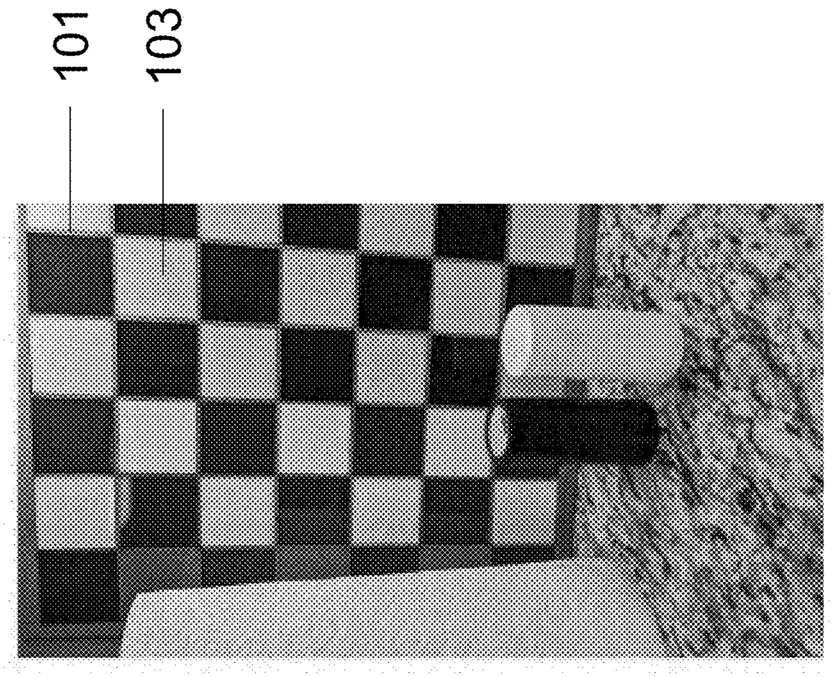

FIG. 1B shows an example of a prototype flexible frame. FIG. 1C shows an example of the tile system having the plurality of tiles secured in the flexible frame.

Figure 2A:
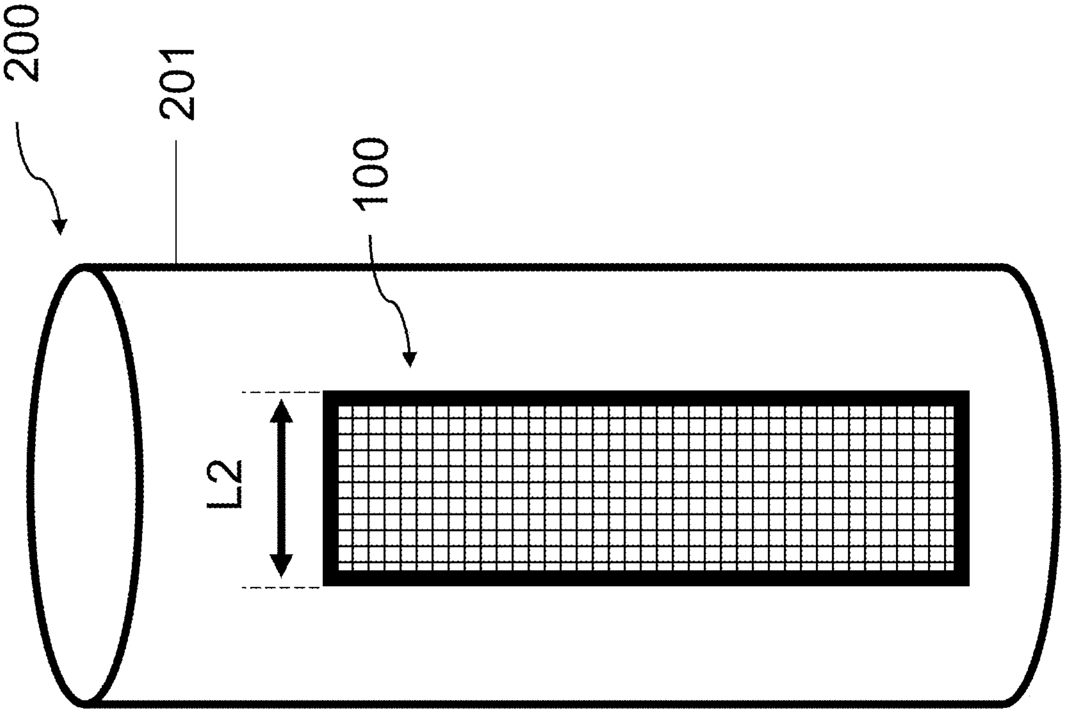
FIG. 2A is a schematic illustration of a tile system comprising a flexible frame in a container.

FIG. 2A shows the tile system 200 comprising the flexible frame 100 in the container 201. The second length L2 is the length of the first length L1 within the container 201. Accordingly, the flexible frame 100 can be, for example, rolled up or folded to be contained in the container 201. The flexible properties facilitate transportation, or storage, of the tile system 200.

Figure 2B:
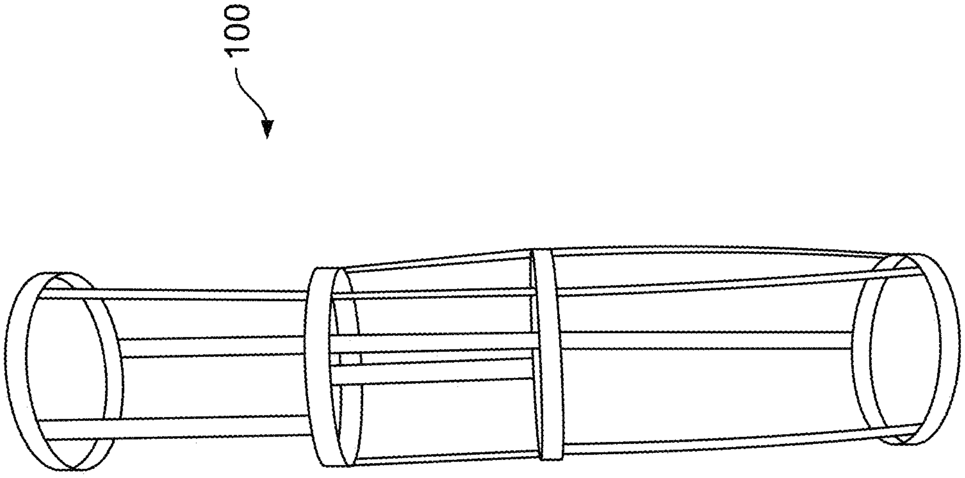
FIG. 2B is a schematic illustration of an embodiment of a rolled up flexible frame, which may be placed in a container.

The flexible frame 100 within the container 201 may comprise a wound flexible frame, a folded flexible frame, or a combination thereof, and the shape of the flexible frame is not necessarily limited thereto. The container is not limited to having a rigid structure or shape, and may utilize any suitable means to hold the flexible frame in a smaller size. For example, the container 201 may comprise a flexible system, such as a shrink-wrap, or a string to hold the flexible frame, as long as it can hold the flexible frame in a smaller size. For example, a wound flexible frame of an embodiment is shown in FIG. 2B.

The tile system 200 may further comprise the plurality of tiles 103. For example, a kit comprising the flexible frame 100, the plurality of tiles 103, may be put in the container 201, to be shipped to a vendor or a customer.

The frame of the tile system may have an indication for each of the plurality of windows corresponding to each of the plurality of tiles. The each of the plurality of tiles of the tile system may have an indication corresponding to each of the plurality of windows.

Figure 3:
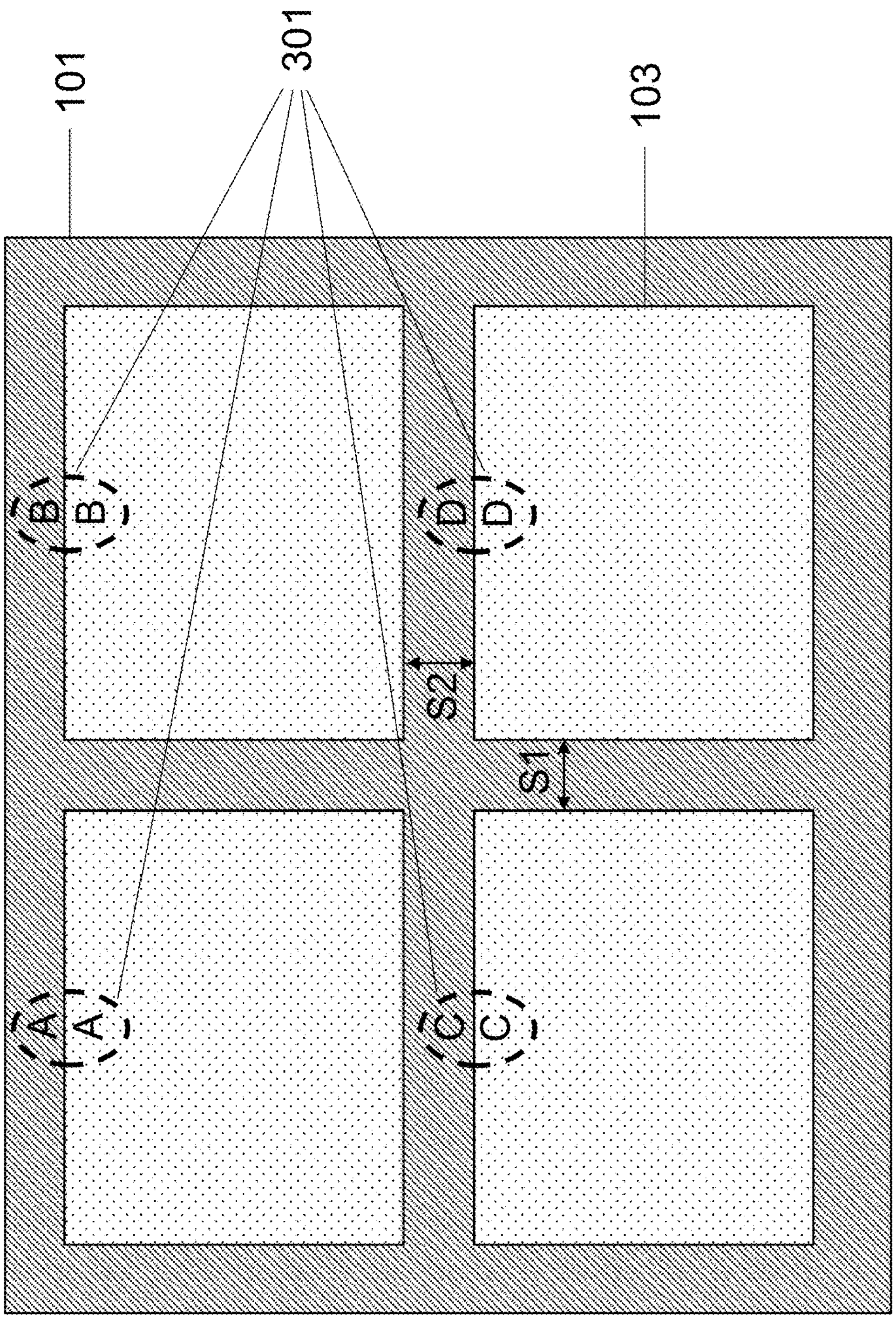
FIG. 3 is a schematic illustration of a portion of a tile system comprising a flexible frame and a plurality of tiles, wherein the flexible frame and the plurality of tiles have an indication.

FIG. 3 shows a portion of the tile system comprising the frame component 101 and the plurality of tiles 103. The indication 301 may comprise a mark, numerical indication, or alphabetical indication, which can provide guidance to match a tile to a corresponding window to provide a tile and window pair of the tile system. The indication may be on a front side, a back side, or a combination thereof, of the frame. The indication may be on a front side, a back side, or a combination thereof, of the plurality of tiles. Although FIG. 3 illustrates the indication 301 on both the frame and the plurality of tiles, it does not need to be on both the frame and the plurality of tiles. The indication 301 may be on the frame, the plurality of tiles, or a combination thereof, and a map may be accompanied with the indication. The map will be described further.

In an embodiment, a tile system comprises: a plurality of tiles, wherein the plurality of tiles has a tile parameter comprising a size and a shape; and a flexible frame, wherein the flexible frame has a plurality of windows configured to removably hold the plurality of tiles, the plurality of windows separated by a spacing parameter, and a frame parameter comprising a size and a shape according to the tile parameter and the spacing parameter, and wherein at least one of the plurality of tiles, the flexible frame having the plurality of windows, or a combination thereof, has an indication to match at least one tile of the plurality of tiles with at least one corresponding window of the plurality of windows.

Figure 4B:
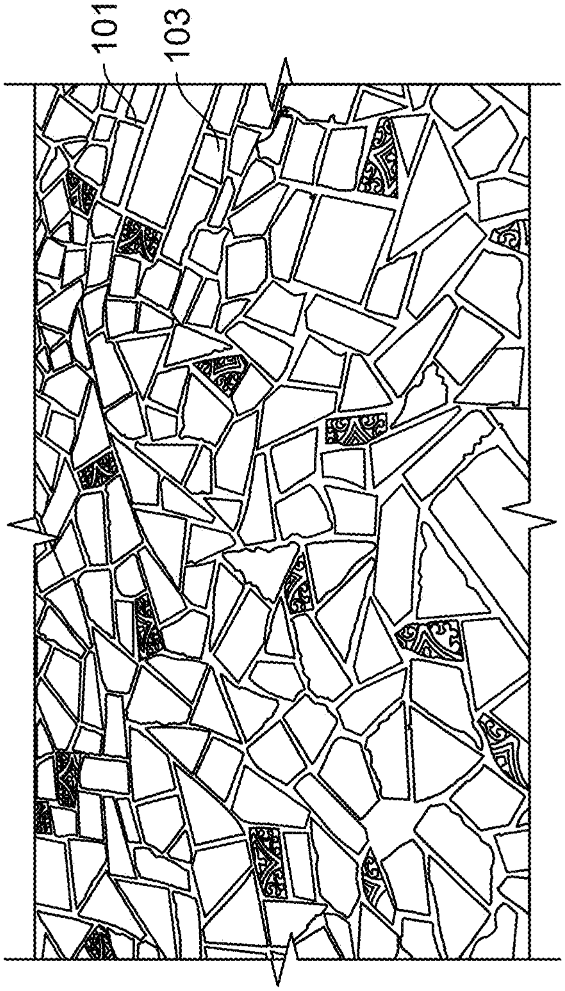
FIGS. 4A and 4B are each a schematic illustration of an embodiment of a plurality of tiles having different tile parameters.
Figure 4A:
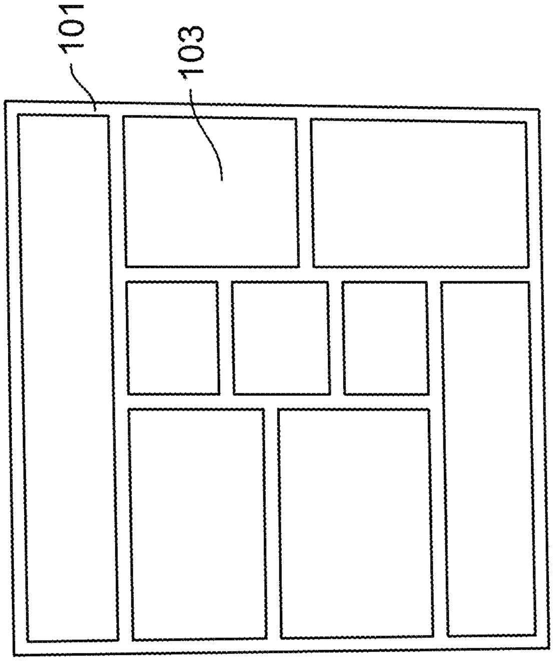
Figure 7A:
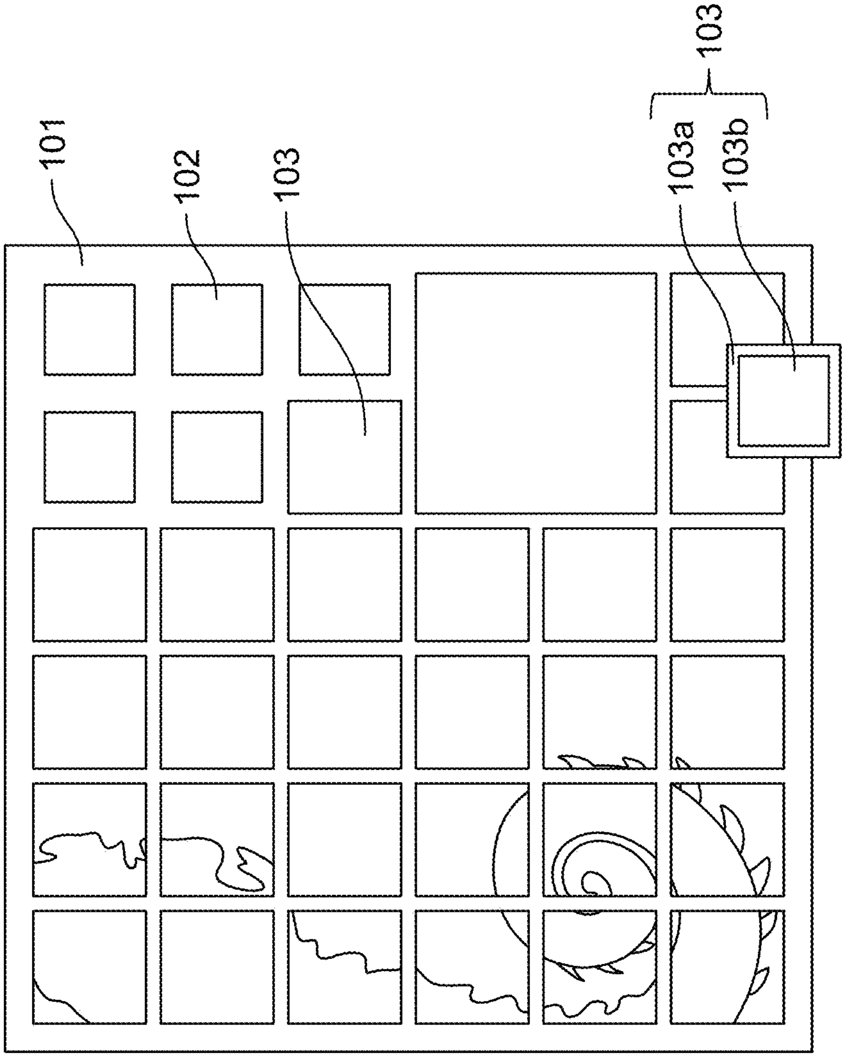
FIG. 7A is a schematic illustration of an embodiment of a tile system having a desired image printed on a plurality of tiles to provide a tile pattern.

The tile parameter comprises the size and the shape, wherein the size may refer to the longest length of the tile. The size may be for example, 0.1 in to 100 in, 1 in to 50 in, or 5 in to 30 in, but the size may not be limited thereto. The shape of the tile may be for example, in a form of a square, a circle, an oval, a triangle, a rectangle, a pentagon, a hexagon, or a combination thereof, but is not limited thereto, and can be any random shape. The tile parameter may further comprise a texture, a thickness, a material, or a combination thereof. For example, the tile may have a smooth, or a rough texture. For example, the tile may have a thickness which is the same as a thickness of the frame, or may have a thickness that is different from a thickness of the frame. The tile may comprise any suitable material and may comprise glass, ceramic, polymer, wood, metal, or a combination thereof, but is not limited thereto. For example, suitable metal may be copper, nickel, chromium, zinc, iron, an alloy thereof, such as stainless steel, brass, bronze, or a combination thereof. The tile may comprise a multi-layer tile, wherein each layer of the multi-layer tile comprises a suitable material. In an aspect, each layer of the multi-layer tile comprises glass, ceramic, polymer, wood, metal, or a combination thereof. In an aspect, the multi-layer tile comprises a first tile layer 103*a* and a second tile layer 103*b* as shown in FIG. 7A. The plurality of tiles may have a plurality of shapes, sizes, textures, thicknesses, or materials. In an aspect, each tile of the plurality of tiles has a same shape, size, texture, thickness, or material. In an aspect, the tiles have a different shape, size, texture, thickness, material, or a combination thereof. For example, the tile may be a 3-dimensional (3D) structure having any suitable shape, size, texture, thickness, material, or a combination thereof. FIGS. 4A and 4B show examples of the plurality of tiles having different tile parameters.

The frame parameter comprising a size and a shape may be defined according to the tile parameter and the spacing parameter. The spacing parameter may comprise a length of the spacing between the plurality of tiles, and may be uniform, or nonuniform throughout the tile system. For example, in FIG. 3, a length of the spacing S1 may be the same as, or different from, a length of the spacing S2. Also, S1 may be uniform or nonuniform along the vertical axis, and S2 may be uniform or nonuniform along the horizontal axis. The length of the spacing is not limited, and may be less than, the same as, or greater than the size of the tile.

The tile system may further comprise a map comprising an indication of at least one tile of the plurality of tiles with at least one corresponding window of the plurality of windows. The map refers to an instruction or a guideline for matching the plurality of tiles with the corresponding plurality of windows based on the indication provided therein.

Figure 5B:
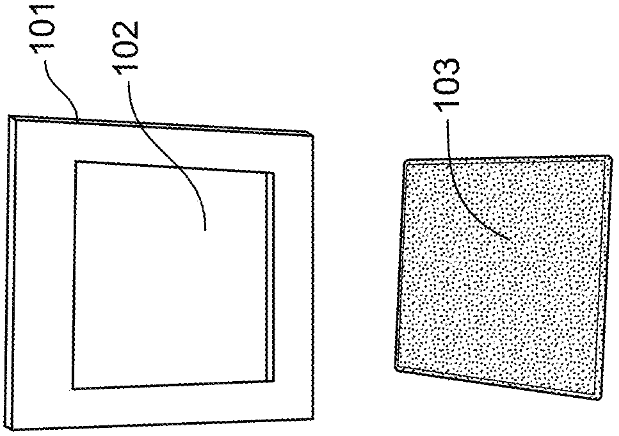
FIG. 5B is a schematic illustration of the embodiment of FIG. 5A after the tile being removed from the flexible cork frame.
Figure 5A:
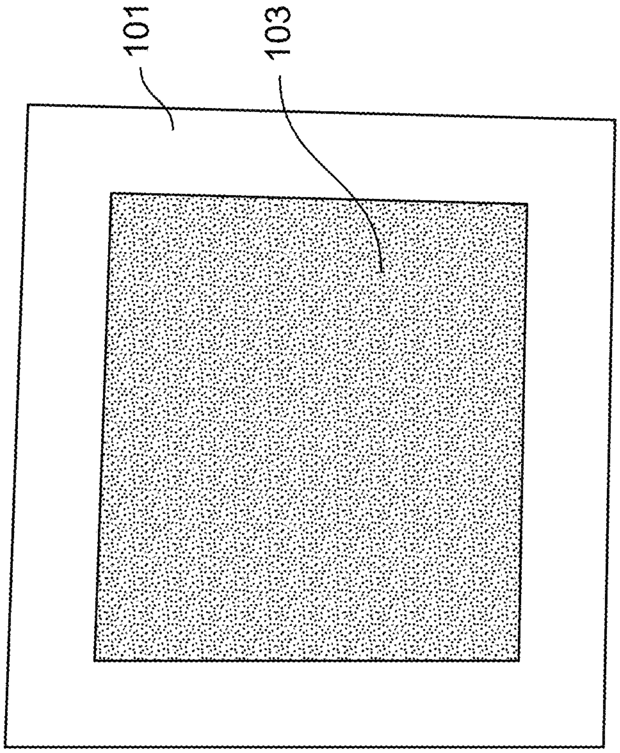
FIG. 5A is a schematic illustration of an embodiment of a tile secured to a flexible cork frame with a compression force.

The plurality of tiles of the tile system may be secured to the flexible frame with a compression force. In an aspect, no permanent adhesive, glue, or grout, is used to secure the plurality of tiles to the flexible frame. Compression force refers to a force exerted on an object. In an aspect, compression force may refer to a force reasonably exerted on an object when pressed by a human. FIGS. 5A and 5B show an example of a tile secured to a flexible cork frame with a compression force, and the tile removed from the flexible cork frame afterwards. For example, the tile can be removed at will to be cleaned in a dishwasher and reused, or simply be swapped out with a new design.

The flexible frame may comprise a flexible material comprising a natural polymer, a synthetic polymer, or a combination thereof. The natural polymer may be wood such as a bamboo, birch, or cork, a natural rubber, or a combination thereof. The synthetic polymer may be a thermoplastic elastomer (TPE). Representative polymeric materials for the flexible material include ethylene vinyl acetate (EVA), polyvinyl chloride (PVC), polyurethane (PU), silicone rubber, neoprene, polypropylene (PP), or a combination thereof. The flexible material may be a combination of any of the aforementioned materials, but is not limited thereto, and can be any suitable flexible material. A combination comprising at least one of the foregoing may be used. Flexible refers to an ability of a material or an object to bend, twist, or deform without breaking or losing its shape permanently. Flexible materials have a degree of elasticity and can be easily manipulated or molded into different shapes or forms. Flexibility or elasticity can be represented by, Young's modulus, which has a unit of pascals (Pa) and has a decreasing value as the flexibility increases. In an aspect the Young's modulus of the flexible material may be 5 megapascals (MPa) to 3000 MPa, 50 MPa to 300 MPa, or 100 MPa to 200 MPa.

The flexible frame may be nonporous. Nonporous herein refers to being resistant to the passage and entrapment of a fluid, or vapor. Representative nonporous materials include polypropylene (PP), polyurethane (PU), polyethylene terephthalate (PET), or polytetrafluoroethylene (PTFE). The nonporous material may be resistant to stain, mold, or mildew.

Figure 6A:
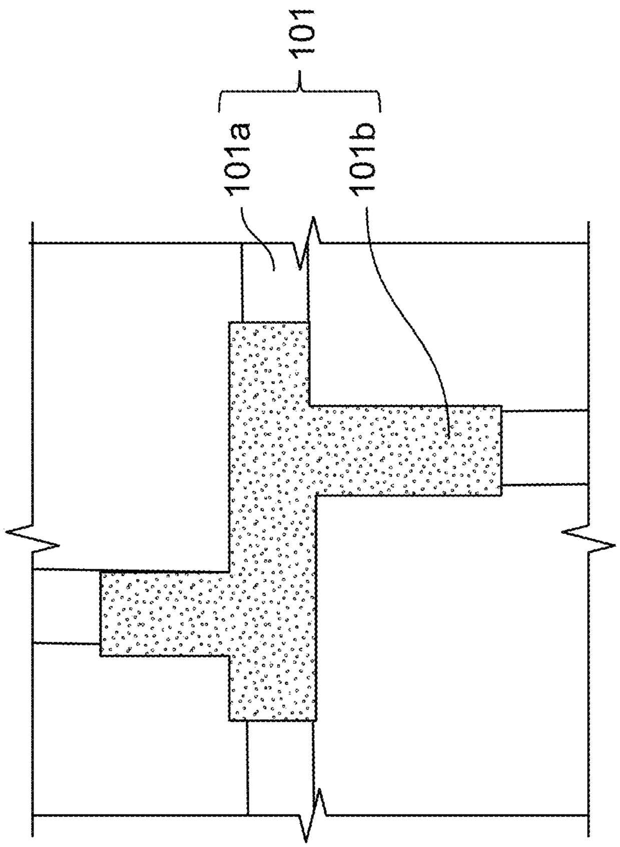
FIGS. 6A and 6B are schematic illustrations of an embodiment of a multi-layer frame, each showing a top view and a side view of the multi-layer frame.
Figure 6B:
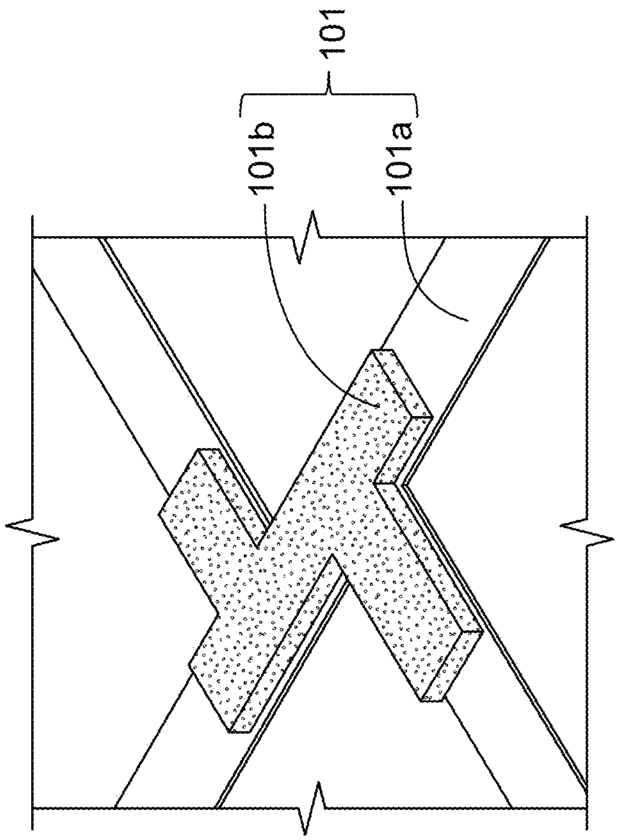

The flexible frame may be a multi-layer frame, wherein each layer of the multi-layer frame comprises a suitable flexible material. In an aspect, the flexible frame may be a multi-layer frame, wherein each layer of the multi-layer frame comprises wood, a natural polymer, a synthetic polymer, or a combination thereof. The Top and side views of the multi-layer frame of an embodiment comprising a first flexible frame layer 101*a* and a second flexible frame layer 101*b* are shown in FIGS. 6A and 6B.

In an embodiment, the flexible frame may further comprise an adhesive on a rear side of the frame. In an aspect, the flexible frame can be permanently or semi-permanently secured to a surface, for example, a wall. In another embodiment, the flexible frame may not comprise an adhesive on a rear side of the frame. Accordingly, the flexible frame can be removed after securing the tiles to the surface permanently or semi-permanently, functioning as a guide for the tiles to be secured to the surface. The adhesive may be any substance suitable for bonding two surfaces together, for example, an epoxy, a two-sided tape, a glue such as cyanoacrylate, or polyvinyl acetate, silicone, or a combination thereof.

The plurality of tiles may comprise a functional tile. The functional tile may comprise a holder unit, a hanger unit, a light-up unit, or a combination thereof. The functional tile may comprise, for example, a soap holder, a shampoo holder, a towel hanger, a light-up unit, for the tile system in a bath or a shower, or a seasonings holder, a dishwash sponge holder, a utensil hanger, a pot hanger, a light-up unit, for the tile system in a kitchen. Accordingly, the functional tiles may be replaced as desired.

Method of Providing a Tile System

Disclosed is a method of providing a tile system comprising: providing an image for a tile pattern; defining a tile parameter comprising a size and a shape of a plurality of tiles, wherein the plurality of tiles is combined to form the tile pattern; defining a spacing parameter of the spacing between the plurality of the tiles; providing a flexible frame having a plurality of windows configured to removably hold the plurality of tiles, wherein a frame parameter comprising a size and a shape of the flexible frame is defined according to the tile parameter of the plurality of tiles and the spacing parameter of the spacing between the plurality of tiles; and providing the plurality of tiles according to the tile parameter of the plurality of tiles, to provide a tile system.

Figure 7C:
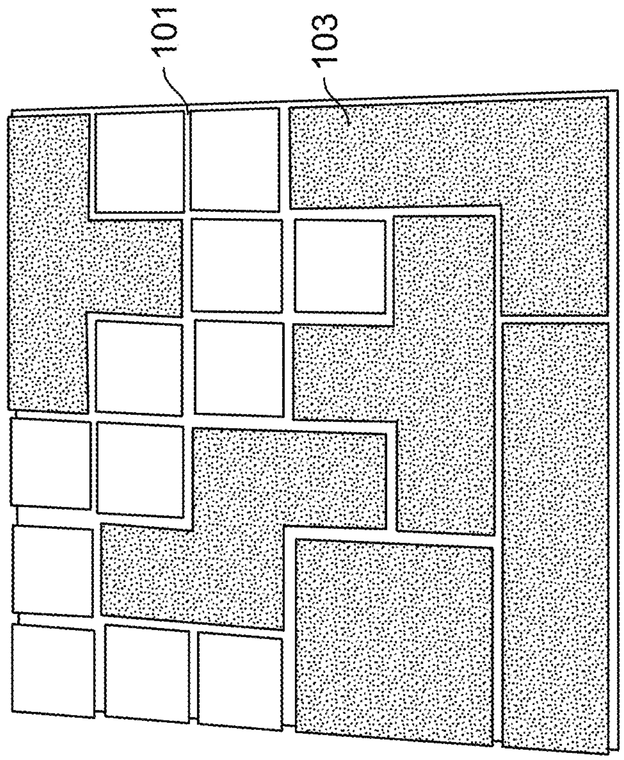
FIGS. 7B and 7C are each a schematic illustration of an embodiment showing different tile patterns.
Figure 7B:
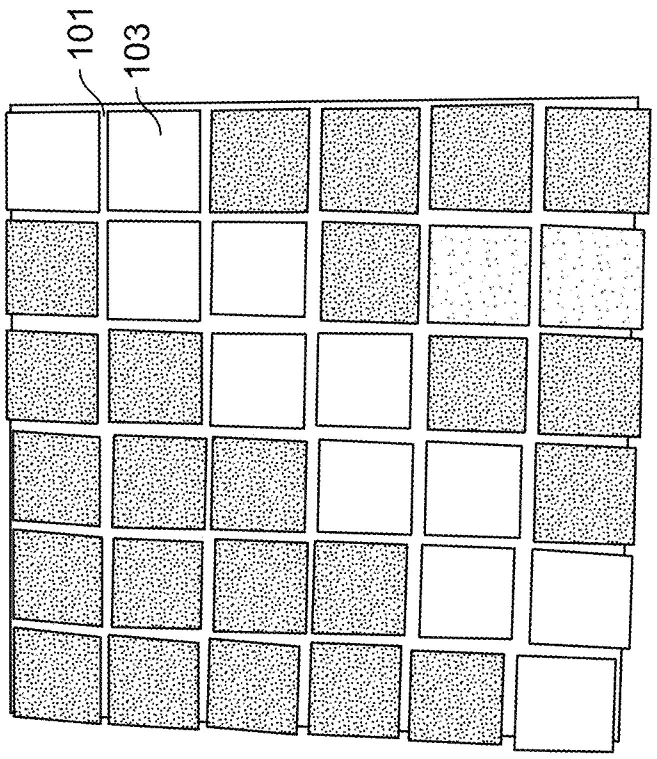
Figure 7D:
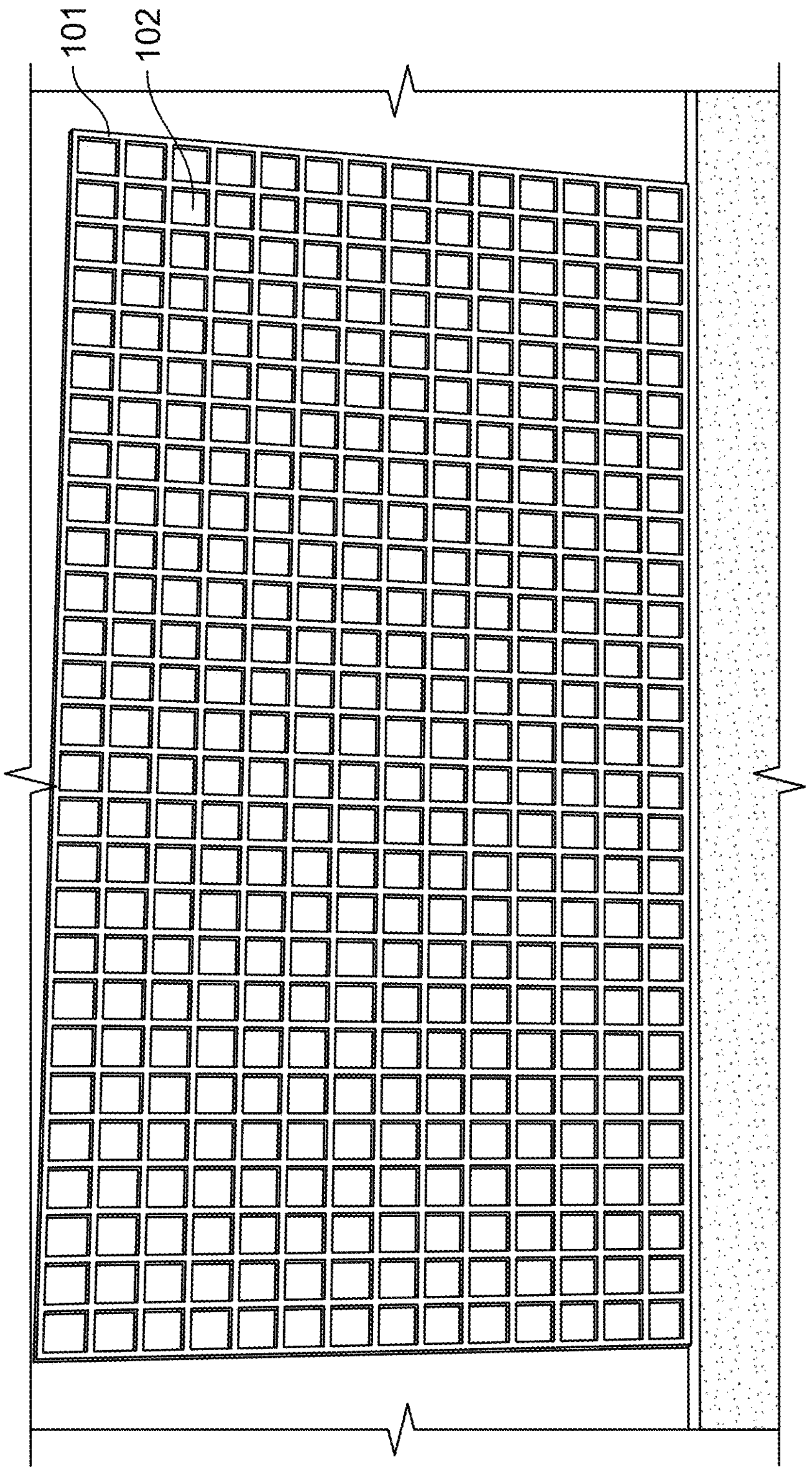
FIG. 7D is a schematic illustration of an embodiment of a tile system comprising a flexible frame disposed on a wall.
Figure 7E:
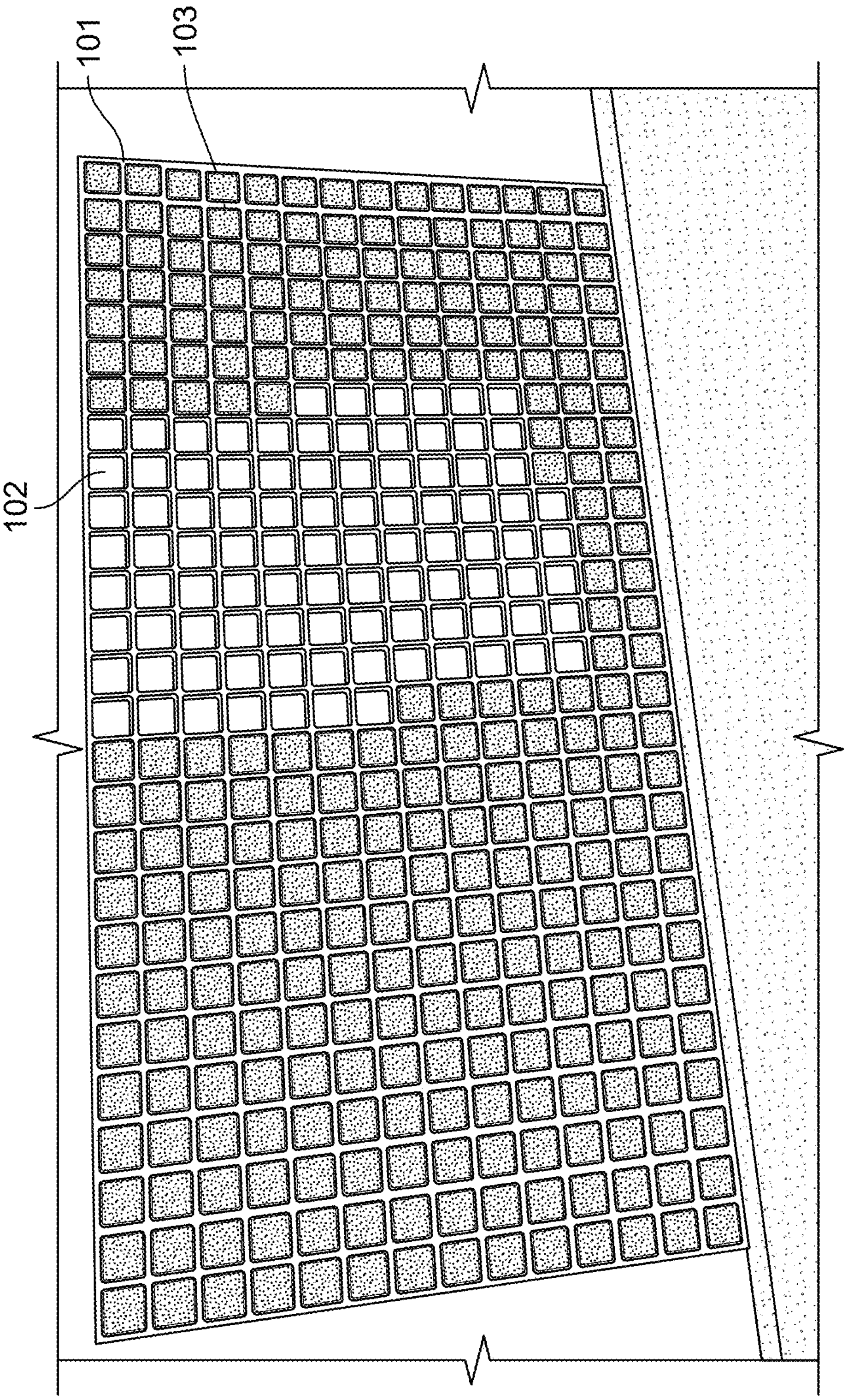
FIG. 7E is a schematic illustration of FIG. 7D with a plurality of tiles secured to the flexible frame disposed on the wall.

FIG. 7A shows an example of the tile system having a desired image printed on a plurality of tiles to provide a tile pattern. As shown, the structural mesh made from cardboard provides the ability to create different aesthetic patterns, use different sized square tiles, and continuously rearrange and update the look of the tile arrangement. Also, the plurality of tiles can be replaced with tiles having different sizes and shapes to provide a different tile pattern as shown in FIGS. 7B-7C. Further, FIG. 7D shows an embodiment of the tile system comprising the flexible frame disposed on a wall, and FIG. 7E shows the embodiment with a plurality of tiles secured to the flexible frame disposed on the wall.

The at least one tile of the plurality of tiles, the flexible frame having the plurality of windows, or a combination thereof, may have an indication to match at least one of the plurality of tiles with a corresponding window of the plurality of windows.

The method of providing the tile system may further comprise rolling up the flexible frame, or folding the flexible frame; and optionally placing the rolled up or folded flexible frame in a container feasible for shipment or storage.

The plurality of tiles may be secured to the flexible frame with a compression force.

For example, a consumer may develop a design. The consumer can select a desired image for a tile pattern for a kitchen backsplash, and define a tile parameter, a spacing parameter, and a frame parameter according to the consumer's kitchen dimensions and the desired look. The materials for the tiles and the flexible frame along with other parameters may be selected as well. The provider may then manufacture the flexible frame, and tiles according to the customer's input, and ship a kit comprising the rolled up flexible frame and tiles in a container, which may include a map or an instruction to guide the matching tiles and windows of the flexible frame. The plurality of tiles, flexible frame, or a combination thereof, may have e.g., printed indication. The consumer may take out the rolled up flexible frame and tiles from the container, and unroll the flexible frame in a planar configuration to have it ready for installment.

Method of Manufacturing a Flexible Frame

Disclosed is a method of manufacturing a flexible frame comprising: providing a flexible material in a form of a sheet; cutting the flexible material to create the plurality of windows; and removing the cut portions of the flexible material from the flexible material, wherein the cutting comprises die-cutting, laser-cutting, water-jet cutting, or a combination thereof, to manufacture the flexible frame.

The providing the flexible frame may comprise manufacturing the flexible frame, and the manufacturing of the flexible frame may comprise providing a flexible material in a form of a sheet (e.g., board, layer, panel, ply, or slab), cutting the flexible material to create the plurality of windows, wherein the cutting comprises die-cutting, laser-cutting, water-jet cutting, or a combination thereof, and removing the cut portions of the flexible material from the flexible material to create the frame to manufacture the flexible frame. The cutting may also comprise punching, plasma cutting, chisel cutting, or scissor cutting, but is not limited, and may include any suitable cutting method.

In an embodiment, the method of manufacturing the flexible frame may comprise 3D-printing the frame to manufacture the flexible frame.

Method of Installing a Tile Pattern

Disclosed is a method of installing a tile pattern using the tile system, the method comprising: placing the flexible frame on a surface; and placing at least one tile of the plurality of tiles in at least one window the plurality of windows; and securing the plurality of tiles by compression force to create the tile pattern.

In an embodiment, the method of installing the tile pattern using the tile system may further comprise attaching the flexible frame on the surface, wherein the attaching comprises contacting the surface to a rear side of the frame comprising an adhesive, to secure the frame to the surface. Accordingly, the flexible frame can be permanently or semi-permanently secured to the surface, for example, a wall. Accordingly, the flexible frame can function as a grout, and the tiles may be easily replaced for an updated look, or for cleaning. The adhesive may be any substance suitable for bonding two surfaces together, for example, an epoxy, a two-sided tape, a glue such as cyanoacrylate, or polyvinyl acetate, silicone, or a combination thereof.

In an embodiment, the method of installing the tile pattern using the tile system may further comprise applying an adhesive to a rear side of the plurality of tiles, placing at least one tile of the plurality of tiles in at least one window of the plurality of windows in a direction that the adhesive contacts the surface to secure the plurality of tiles to the surface, and removing the flexible frame. Accordingly, the flexible frame can be removed after securing the tiles to the surface permanently or semi-permanently, functioning as a guide for the tiles to be secured to the surface. Thus, the flexible frames can be used as a temporary template for spacing tiles into complex patterns, and then removed so that grout can be applied.

Accordingly, the tile system and installation method provided herein may aid the customer to easily design a desired tile pattern, install the desired tile pattern, and rearrange the tile design as often as desired cost-effectively.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

Disclosed is a tile system comprising: a container; and a flexible frame within the container, the flexible frame having a plurality of windows configured to removably hold a plurality of tiles, wherein the flexible frame has a first length and a second length, wherein the first length is a length of a longest axis of the flexible frame in a planar configuration, the second length is the first length within the container, and the second length is less than the first length.

Also disclosed is a tile system comprising: a plurality of tiles, wherein the plurality of tiles has a tile parameter comprising a size and a shape; and a flexible frame, wherein the flexible frame has a plurality of windows configured to removably hold the plurality of tiles, the plurality of windows separated by a spacing parameter, and a frame parameter comprising a size and a shape according to the tile parameter and the spacing parameter, and wherein at least one of the plurality of tiles, the flexible frame having the plurality of windows, or a combination thereof, has an indication to match at least one tile of the plurality of tiles with at least one corresponding window of the plurality of windows.

Also disclosed is a method of providing a tile system, the method comprising: providing an image for a tile pattern; defining a tile parameter comprising a size and a shape of a plurality of tiles, wherein the plurality of tiles is combined to form the tile pattern; defining a spacing parameter of the spacing between the plurality of the tiles; providing a flexible frame having a plurality of windows configured to removably hold the plurality of tiles, wherein a frame parameter comprising a size and a shape of the flexible frame is defined according to the tile parameter of the plurality of tiles and the spacing parameter of the spacing between the plurality of tiles; and providing the plurality of tiles according to the tile parameter of the plurality of tiles, to provide a tile system.

Also disclosed is a method of manufacturing a flexible frame, the method comprising: providing a flexible material in a form of a sheet; cutting the flexible material to create the plurality of windows; and removing the cut portions of the flexible material from the flexible material, wherein the cutting comprises die-cutting, laser-cutting, water-jet cutting, or a combination thereof, to manufacture the flexible frame.

Also disclosed is a method of installing a tile pattern using the tile system, the method comprising: placing the flexible frame on a surface; and placing at least one tile of the plurality of tiles in at least one window the plurality of windows; and securing the plurality of tiles by compression force to create the tile pattern.

In any of the foregoing aspects, the tile system or method further comprises the plurality of tiles, the frame has an indication for each of the plurality of windows corresponding to each of the plurality of tiles, each of the plurality of tiles has an indication corresponding to each of the plurality of windows, the flexible frame within the container comprises a wound flexible frame, a folded flexible frame, or a combination thereof, the tile system further comprises a map comprising an indication of at least one tile of the plurality of tiles with at least one corresponding window of the plurality of windows, the plurality of tiles is secured to the flexible frame with a compression force, the flexible frame comprises a flexible material comprising wood, a natural polymer, a synthetic polymer, or a combination thereof, the flexible frame is nonporous, the flexible frame is a multi-layer frame, wherein each layer of the multi-layer frame comprises wood, a natural polymer, a synthetic polymer, or a combination thereof, the flexible frame further comprises an adhesive on a rear surface of the frame, the plurality of tiles comprises a functional tile, the functional tile comprising a holder unit, a hanger unit, a light-up unit, or a combination thereof, at least one tile of the plurality of tiles, the flexible frame having the plurality of windows, or a combination thereof, has an indication to match at least one of the plurality of tiles with a corresponding window of the plurality of windows, providing the flexible frame comprises manufacturing the flexible frame, and the manufacturing of the flexible frame comprises providing a flexible material in a form of a sheet, cutting the flexible material to create the plurality of windows, wherein the cutting comprises die-cutting, laser-cutting, water-jet cutting, or a combination thereof, and removing the cut portions of the flexible material from the flexible material to create the frame to manufacture the flexible frame, the method further comprises rolling up the flexible frame, or folding the flexible frame, and optionally placing the rolled up or folded flexible frame in a container feasible for shipment or storage, the plurality of tiles is secured to the flexible frame with a compression force, the method comprises 3D-printing the frame to manufacture the flexible frame, the method of installing the tile pattern further comprises attaching the flexible frame to the wall, wherein the attaching comprises contacting the wall to a rear surface of the frame comprising an adhesive, to secure the frame to the surface, the method of installing the tile further comprises applying an adhesive to a rear surface of the plurality of tiles, placing at least one tile of the plurality of tiles in at least one window of the plurality of windows in a direction that the adhesive contacts the wall to secure the plurality of tiles to the surface, and removing the flexible frame.

What is claimed is:

1. A tile system comprising:

a container;

a flexible frame within the container, the flexible frame having a plurality of windows configured to removably hold a plurality of tiles, wherein the flexible frame has a first length and a second length, wherein the first length is a length of a longest axis of the flexible frame in a planar configuration, the second length is the first length within the container, and the second length is less than the first length; and the plurality of tiles, wherein the plurality of tiles is configured to be secured to the flexible frame with a compression force.

2. The tile system of claim 1, wherein the frame has an indication for at least one window of the plurality of windows corresponding to at least one tile of the plurality of tiles, and the at least one tile of the plurality of tiles has an indication corresponding to the at least one window of the plurality of windows.

3. The tile system of claim 2, wherein the frame has an indication for each of the plurality of windows corresponding to each of the plurality of tiles, and the each of the plurality of tiles has an indication corresponding to the each of the plurality of windows.

4. The tile system of claim 1, wherein the flexible frame within the container comprises a wound flexible frame, a folded flexible frame, or a combination thereof.

5. The tile system of claim 1, further comprising a map comprising an indication of at least one tile of the plurality of tiles with at least one corresponding window of the plurality of windows.

6. The tile system of claim 1, wherein the flexible frame is nonporous.

7. The tile system of claim 1, wherein the flexible frame is a multi-layer frame, wherein each layer of the multi-layer frame comprises wood, a natural polymer, a synthetic polymer, or a combination thereof.

8. The tile system of claim 1, wherein the flexible frame further comprises an adhesive on a rear surface of the frame.

9. The tile system of claim 1, wherein the plurality of tiles comprises a functional tile, the functional tile comprising a holder unit, a hanger unit, a light-up unit, or a combination thereof.

10. The tile system of claim 1, wherein the tile comprises glass, ceramic, polymer, wood, metal, or a combination thereof.

11. The tile system of claim 1, wherein the plurality of tiles has a tile parameter comprising a size and a shape, the windows of the plurality of windows of the flexible frame are separated by a spacing parameter, and a frame parameter comprises a size and a shape according to the tile parameter and the spacing parameter.

12. A method of providing a tile system, the method comprising:

providing an image for a tile pattern;

defining a tile parameter comprising a size and a shape of a plurality of tiles, wherein the plurality of tiles is combined to form the tile pattern;

defining a spacing parameter of the spacing between the plurality of the tiles;

providing a flexible frame having a plurality of windows configured to removably hold the plurality of tiles, wherein a frame parameter comprising a size and a shape of the flexible frame is defined according to the tile parameter of the plurality of tiles and the spacing parameter of the spacing between the plurality of tiles;

providing the plurality of tiles according to the tile parameter of the plurality of tiles;

rolling up the flexible frame, or folding the flexible frame; and placing the rolled up or folded flexible frame in a container feasible for shipment or storage to provide the tile system of claim 1.

13. A method of manufacturing a flexible frame, the method comprising:

providing a flexible material in a form of a sheet;

cutting the flexible material to create the plurality of windows; and removing the cut portions of the flexible material from the flexible material, wherein the cutting comprises die-cutting, laser-cutting, water-jet cutting, or a combination thereof, to manufacture the flexible frame of claim 1.

14. The method of manufacturing the flexible frame of claim 13, the method comprising 3D-printing the frame to manufacture the flexible frame.

* * * * *